United States Patent
Buyukkoc

Patent Number: 6,108,652
Date of Patent: Aug. 22, 2000

[54] MULTICAST PROBABILITY-BASE GROUPING OF NODES IN SWITCHED NETWORK FOR IMPROVED BROADCAST SEARCH

[75] Inventor: Cagatay Buyukkoc, Holmdel, N.J.

[73] Assignee: AT&T Corp., New York, N.Y.

[21] Appl. No.: 08/982,177

[22] Filed: Dec. 1, 1997

[51] Int. Cl.[7] ................................................. G06F 17/30
[52] U.S. Cl. ................................. 707/5; 707/10; 379/221
[58] Field of Search ............ 707/10, 3–6; 709/217–219, 709/226; 714/11, 12; 379/220–221

[56] References Cited

U.S. PATENT DOCUMENTS

| | | | |
|---|---|---|---|
| 5,491,817 | 2/1996 | Gopal et al. | 707/200 |
| 5,506,847 | 4/1996 | Shobatake | 370/338 |
| 5,751,971 | 5/1998 | Dobbins et al. | 709/238 |
| 5,802,053 | 9/1998 | Bollella et al. | 370/401 |
| 5,848,404 | 12/1998 | Hafner et al. | 707/3 |
| 5,859,899 | 1/1999 | Sakai et al. | 379/92.01 |
| 5,884,038 | 3/1999 | Kapoor | 709/226 |
| 5,926,463 | 7/1999 | Ahearn et al. | 370/254 |
| 6,011,782 | 1/2000 | DeSimone et al. | 370/260 |
| 6,018,766 | 1/2000 | Samuel et al. | 709/218 |

*Primary Examiner*—Hosaint T. Alam

[57] ABSTRACT

In a local area network emulation architecture, an improved search approach is achieved when the set of nodes to be searched is divided into N subsets for a seriatim search through the subsets. The allocation of the nodes to the different subsets is algorithmically determined for minimum, or near minimum, utilization of resources. Illustratively, the algorithm disclosed determines whether a node in subset i should be reassigned to subset i+1 based on whether $$\varepsilon \le \frac{p_i}{(k_{i+1} + 1)},$$

where $\epsilon$ is the probability that the node under consideration contains the information searched for, $p_i$ is the probability that the information searched for is found in subset i, and $k_{i+1}$ is the number of nodes in subset i+1. The algorithm determines whether a node in subset i should be reassigned to subset i−1 based on whether $$\varepsilon \ge \frac{p_{i-1}}{(k_i - 1)},$$

where $\epsilon$ is the probability that the node under consideration contains the information searched for, $p_{i-1}$ is the probability that the information searched for is found in subset i−1, and $k_i$ is the number of nodes in subset i. As time progresses and search results are accumulated, the results are used to reassess probability values and to reapply the reassignment thresholds.

14 Claims, 2 Drawing Sheets

MULTICAST PROBABILITY-BASE GROUPING OF NODES IN SWITCHED NETWORK FOR IMPROVED BROADCAST SEARCH

BACKGROUND OF THE INVENTION

This invention relates to switching systems, and more particularly to optimization of communication transmissions in such switching systems when seeking information.

Certain IP (Internet Protocol) and ATM (Asynchronous Transfer Mode) applications require that a broadcast message be sent to a group of potential receivers in order to obtain some information from one or more of the receivers. In IP, for example, ARP requests are made for the specific task of converting an Ethernet address to the corresponding IP address. The request is broadcast on the Ethernet, and the correct recipient responds with an ARP message. The results are usually stored in a cache for future reference. Such caches typically are caused to "age" so that entries which are older than some preselected threshold may be removed. This intends to insure that stale, and perhaps no longer valid, data is not being used, and to insure that the memory occupied by the cache does not grow beyond some preselected bound. Accordingly, information-seeking broadcasts are not out of the ordinary.

In switched architectures, such as ATM, for example, there are no inherent means for carrying out broadcasts. One configuration that is available, pursuant to agreed-upon standards, is a LAN emulation (LANE) architecture where one node serves as a Broadcast and Unknown Server (BUS). In such an arrangement, depicted in FIG. 1, a broadcast is implemented by the BUS sending packets to the entire set of nodes, effectively at the same time, or to groups of nodes, seriatim. The broadcast is maintained as a collection of point to multi-point virtual circuits.

Such an approach to broadcasting represents a fairly intensive use of resources. Accordingly, it is desirable to implement such broadcasting in a manner that efficiently utilizes the available resources.

SUMMARY

In accordance with the principles disclosed herein, the search approach adopted is one where a number of time intervals are selected (N), the set of nodes to be searched is divided into N subsets for a seriatim search through the subsets, and the allocation of the nodes to the different subsets is algorithmically determined for minimum, or near minimum, utilization of resources. If desired, the value of N can be altered and the overall resource utilization cost recomputed to determine which value of N gives a better overall result. Illustratively, the algorithm disclosed determines whether a node in subset i should be reassigned to subset i+1 based on whether $$\varepsilon \le \frac{p_i}{(k_{i+1}+1)},$$

where $\varepsilon$ is the probability that the node under consideration contains the information searched for, $p_i$ is the probability that the information searched for is found in subset i, and $k_{i+1}$ is the number of nodes in subset i+1. The algorithm determines whether a node in subset i should be reassigned to subset i−1 based on whether $$\varepsilon \ge \frac{p_{i-1}}{(k_i-1)},$$

where $\varepsilon$ is the probability that the node under consideration contains the information searched for, $p_{i-1}$ is the probability that the information searched for is found in subset i−1, and $k_i$ is the number of nodes in subset i. As time progresses and search results are accumulated, the results are used to reassess probability values and to reapply the reassignment thresholds.

DETAILED DESCRIPTION

In considering a search approach, one must first select the criteria for measuring the effectiveness of the considered approach. In the context of searching for some information that may be found at some node on a LANE network, both a time element and a resource consumption element (number of virtual circuits used) ought to be considered. Formally, it may be desirable to minimize the cost function $$\min_S \sum_i c_i f_i,$$

where S is a class of search policies, $c_i$ is the relative cost of searching carried out on the $i^{th}$ resource, and $f_i$ is the functional description of the $i^{th}$ resource. Various candidates can be selected for the $f$ function. This includes, for example, expected consumption of time, CPU consumption, bandwidth consumption, etc. The following, by way of example, selects as an objective the minimization of the resources required to find a particular sought information among the various nodes.

In accordance with the principles disclosed herein, the search approach adopted is one where a number of time intervals are selected (N), the set of resources to be searched is correspondingly divided into N subsets, and the subsets are searched seriatim, one set per time interval, until the desired information is found. It is, of course, advantageous to assign the resources to be searched to particular subsets according to relevant criteria in order to minimize the overall resource utilization (or come close to it) before the sought information is found. If desired, the value of N can be altered and the overall cost recomputed to determine which value of N gives a better overall result.

Figure 1:
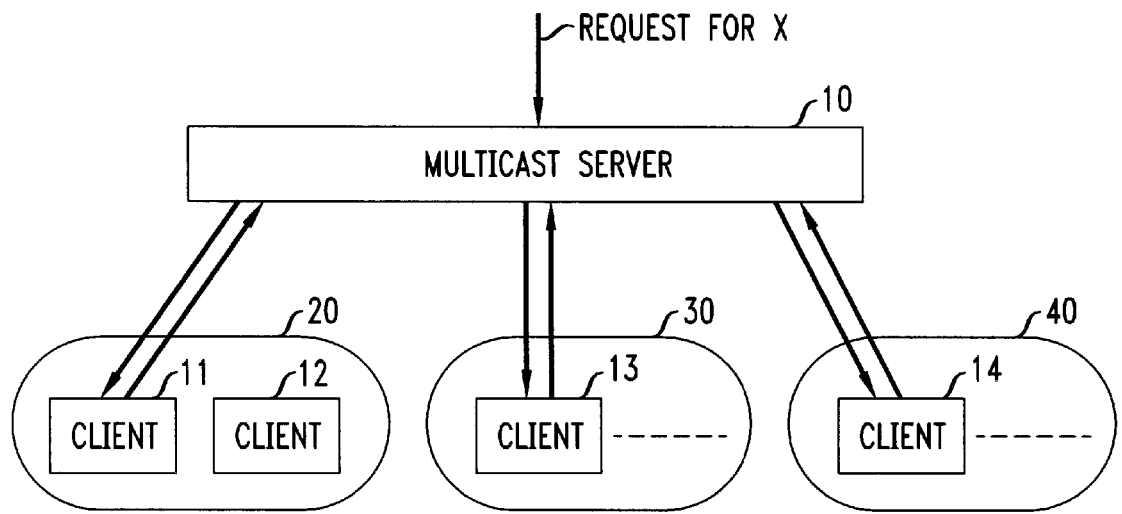
FIG. 1 presents an interconnection diagram in a LANE arrangement.

FIG. 1 depicts an arrangement where multicast server 100 receives a request for information x. It has access to client nodes 110, 120, 130, and 140, and as indicated above, the set of nodes is assigned to a number of subsets. In the FIG. 1 illustration, nodes 110 and 120 are assigned to subset 200, node 130 is assigned to subset 300, and node 140 is assigned to subset 400. Viewed generically and more formally, the set of nodes to be searched is divided into N subsets, and $k_i$ nodes are assigned to subset i.

With such an arrangement, if the information being sought is found in node j with probability $\varepsilon_{ij}$, then the probability that the information being sought is found in subset i is $$p_i = \sum_j \varepsilon_{ij}.$$

The objective is to construct the subsets so that, when a search is conducted sequentially, subset after subset, the average total resource used (before the sought information x is found) is minimized.

Clearly, one approach for minimizing resource use is to maximize the probability that the sought information is found in a subset that is searched early rather than late. Accordingly, one approach is to order the subsets so that $$\frac{p_1}{k_1} \geq \frac{p_2}{k_2} \geq \ldots \geq \frac{p_N}{k_N}.$$

A search in order, starting with index 1

(i.e., the set having an average probability of $\frac{p_1}{k_1}$)

fits the bill.

Figure 2:
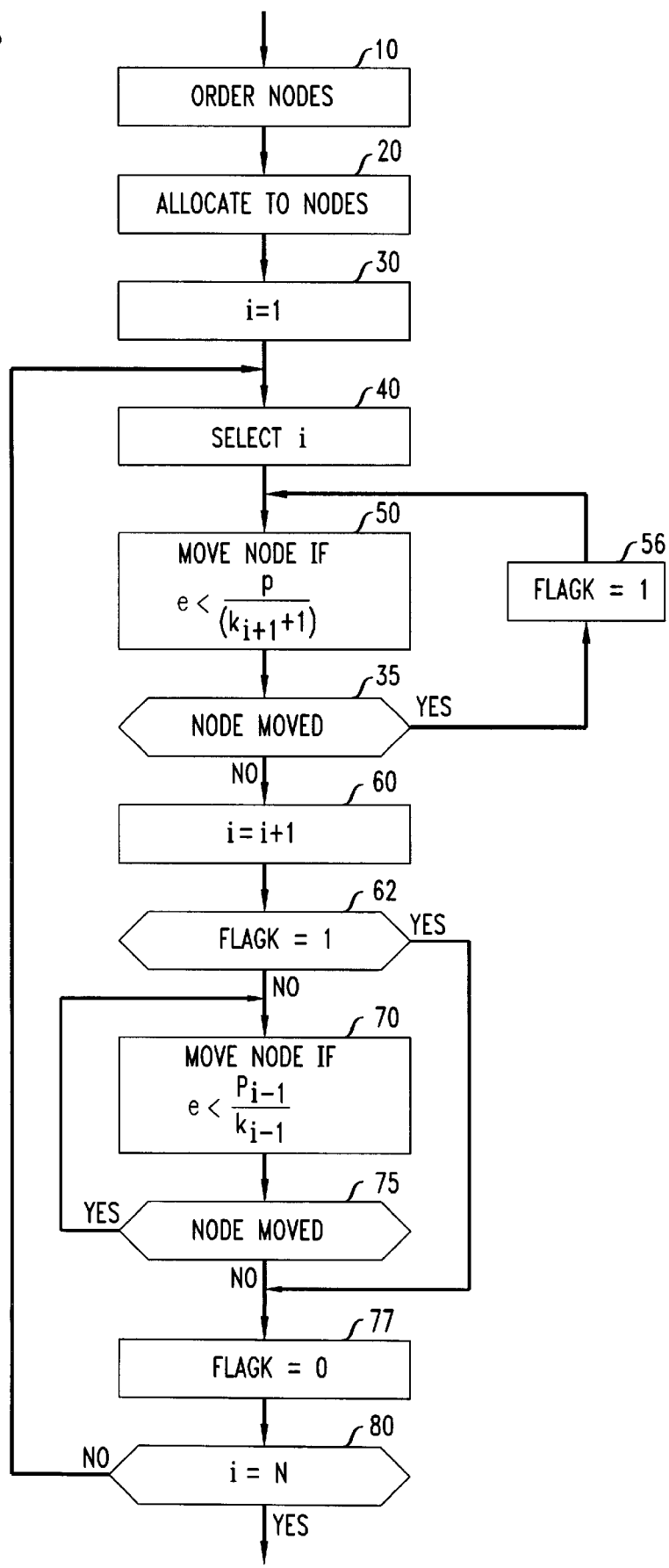
FIG. 2 presents a flow chart of the method disclosed herein for assigning nodes to different subsets in order to minimize resource utilization costs.

The flow chart of FIG. 2 presents one illustrative approach for achieving this objective. To make the explanation of the FIG. 2 flow chart more illustrative, it is assumed that server 100 in FIG. 1 interacts with 16 nodes rather than the four nodes actually shown in FIG. 2. Specifically, it is assumed that server 100 interacts with, or has search access to nodes which carry node IDs 135.16.20.m, where m={100, 102, 103, 144, 1, 4, 8, 17, 18, 19, 22, 23, 26, 31, 33, 35}. Moreover, for the particular application at hand, that of searching for information x, server 100 knows of the nodes in the order shown in Table I below. Each of the nodes has a probability measure associated with the likelihood of finding the desired information in that node. This information is maintained in server 100.

TABLE I

| Node ID | Probability ε | Node ID | Probability ε |
|---|---|---|---|
| 135.16.20.100 | 0.077 | 135.16.20.18 | 0.064 |
| 135.16.20.102 | 0.002 | 135.16.20.19 | 0.078 |
| 135.16.20.103 | 0.027 | 135.16.20.22 | 0.098 |
| 135.16.20.144 | 0.037 | 135.16.20.23 | 0.100 |
| 135.16.20.1 | 0.027 | 135.16.20.26 | 0.090 |
| 135.16.20.4 | 0.027 | 135.16.20.31 | 0.100 |
| 135.16.20.8 | 0.059 | 135.16.20.33 | 0.100 |
| 135.16.20.17 | 0.065 | 135.16.20.35 | 0.050 |

Going through the flow chart of FIG. 2, in block 10 the nodes are ordered based on the probabilities that the sought information is found in the respective nodes. With reference to the above example, the operation of block 10 results in the following order:

TABLE II

| Node ID | Probability ε | Node ID | Probability ε |
|---|---|---|---|
| 135.16.20.33 | 0.100 | 135.16.20.18 | 0.064 |
| 135.16.20.31 | 0.100 | 135.16.20.8 | 0.059 |
| 135.16.20.23 | 0.100 | 135.16.20.35 | 0.050 |
| 135.16.20.22 | 0.098 | 135.16.20.144 | 0.037 |
| 135.16.20.26 | 0.090 | 135.16.20.4 | 0.027 |

TABLE II-continued

| Node ID | Probability ε | Node ID | Probability ε |
|---|---|---|---|
| 135.16.20.19 | 0.078 | 135.16.20.1 | 0.027 |
| 135.16.20.100 | 0.077 | 135.16.20.103 | 0.027 |
| 135.16.20.17 | 0.065 | 135.16.20.102 | 0.001 |

In block 20 of FIG. 2, the ordered nodes are allocated to N subsets. Illustratively selecting N=3, a possible allocation might be as follows:

TABLE III

| Subset 1 | | Subset 2 | | Subset 3 | |
|---|---|---|---|---|---|
| Node ID | Prob ε | Node ID | Prob ε | Node ID | Prob ε |
| 135.16.20.33 | 0.100 | 135.16.20.100 | 0.077 | 135.16.20.8 | 0.059 |
| 135.16.20.31 | 0.100 | 135.16.20.17 | 0.065 | 135.16.20.35 | 0.050 |
| 135.16.20.23 | 0.100 | 135.16.20.18 | 0.064 | 135.16.20.144 | 0.037 |
| 135.16.20.22 | 0.098 | | | 135.16.20.4 | 0.027 |
| 135.16.20.26 | 0.090 | | | 135.16.20.1 | 0.027 |
| 135.16.20.19 | 0.078 | | | 135.16.20.103 | 0.027 |
| | | | | 135.16.20.102 | 0.002 |

The assignment of nodes in Table III is arbitrary, although somewhat constrained by the fact that it starts with the ordered set of Table II and merely selects demarcation lines between the sets. Actually, a completely arbitrary initial assignment (starting with the information of Table I could have been made, because the assignment of Table III is not final. It needs to be tested, and nodes may need to be reassigned, if certain conditions exist. Although it may not be immediately apparent, one of the conditions is that no node in subset j should have a lower probability than any node in subset j+1. Accordingly, starting with the ordered set of Table II is beneficial because it makes the process of searching through the set of nodes for reassignment candidates more efficient.

It should be understood that the objective of the conditions is to insure that the nodes are assigned to subgroups so as to maximize the probability of finding the desired information as quickly as possible. There are many ways to create such conditions, and some are more efficient than others. Some are complex but provide an absolutely optimum solution, while others are simpler but provide only a near-optimum solution. In the following discussion, a relatively simple set of conditions is presented which server 10 can easily and quickly evaluate. The result is a near-optimum solution. As demonstrated below, the solution that is arrived at is a function of the starting assignment.

The conditions that are selected for the presented illustrative example must meet merely two tests:
  a) no subset includes a last member (the one with the lowest probability in the subset) which should be moved to a next subset (the one with nodes having lower probabilities), and
  b) no subset includes a first member (the one with the highest probability in the subset) which should be moved to a previous subset (the one with nodes having higher probabilities).

Blocks 40–60 in FIG. 2 basically perform the first test, while blocks 62–77 perform the second test.

More specifically, block 30 sets index i to 1 and block 40 selects the $i^{th}$ subset and passes control to block 50. Block 50 determines whether a member of the current subset (subset i) should be moved, or assigned, to the next subset (subset i+1). This determination is made based on whether the condition $$\varepsilon \le \frac{p_i}{(k_{i+1} + 1)}$$

holds true. When the ε of the tested node in subset i is such that $$\varepsilon \le \frac{p_i}{(k_{i+1} + 1)},$$

then block 50 moves the node under consideration to subset i+1.

It can be readily reasoned from the nature of the above-defined conditions that the testing should be performed first on the last member of the ordered subset, i.e., the member with the highest E value. If that member fails the condition, other members will surely also fail the condition. Proceeding with the illustrative case of Table III for node 135.16.20.19, when i=1, $$\frac{p_i}{(k_{i+1} + 1)} = \frac{0.566}{4} = .1415.$$

Since the condition 0.078≦0.1415 holds true, the movement of node 135.16.20.19 to subset 2 is called for.

Block 55 assesses whether a node has been reassigned (as it has in this example) by block 50. When so, block 56 sets flag K and returns control to block 50 to repeat the test with the newly designated last member of the evaluated subset. In the current example, block 50 now makes the assessment whether node 135.16.20.26 should be reassigned. In this case, $$\frac{p_i}{(k_{i+1} + 1)} = \frac{0.488}{5} = .0976.$$

Since the condition 0.090≦0.0976 also holds true, the movement of node 135.16.20.26 to subset 2 is also called for. Control is again returned by block 55 to block 50 (through block 56), and the test is again repeated with the newly designated last member of the evaluated subset. That is, block 50 now makes the determination whether node 135.16.20.22 should be reassigned, as the others have been. In this case, $$\frac{p_i}{(k_{i+1} + 1)} = \frac{0.398}{6} = .0663.$$

Since the condition 0.098≦0.0663 does not hold true, the movement of node 135.16.20.22 to subset 2 is not called for. Consequently, block 55 passes control to block 60 which increments i and passes control to block 62.

Block 62 evaluates the state of flag K. A set flag indicates that a node has been moved from subset i to subset i+1. In such a case, a movement of that very same node to its original subset should not be considered. Hence, block 70 may be skipped. In the calculations so far relative to the illustrative example, block 62 passes control to block 77 where the flag K is reset. Thereafter, control passes to block 80 which compares the value of i to N. When i<N, which is the case when i=2, control is returned to block 40, which selects subset 2 for determinations of whether nodes need to be reassigned to subset 3.

Proceeding with consideration of the Table III illustration, the last member of subset 2 is evaluated, and it is determined that $$\frac{p_i}{(k_{i+1} + 1)} = \frac{0.374}{8} = 0.04875.$$

Since the condition 0.64≦0.04875 does not hold true, node 135.16.20.18 should not be reassigned to subset 3. Control passes, therefore, to block 60 where index i is incremented, control then passes to block 62 where the value of flag K is assessed, and thereafter control passes to block 70 (since now flag K is not set).

Block 70 determines whether a node in the subset under consideration should be reassigned to a subset of a lower index i by determining whether the condition $$\varepsilon \le \frac{p_{i-1}}{(k_i - 1)}$$

holds true. When the E of the tested node in subset i is such that $$\varepsilon \ge \frac{p_{i-1}}{(k_i - 1)},$$

then block 70 moves the node under consideration to subset i−1.

Here, too, it can be reasoned that testing of the condition should be performed first on the first member of the subset; i.e., the member with the highest ε value. If that member fails the condition, other members will surely also fail the condition. With reference to the illustrative example, at the first encounter of block 70 i=3, $$\frac{p_{i-1}}{(k_i - 1)} = \frac{0.374}{6} = 0.06235.$$

Since the condition 0.059≧0.06235 does not hold true, the movement of node 135.16.20.8 from subset 3 to subset 2 is not called for. Control then passes to block 75 which ascertains whether a reassignment of a node has occurred. In this case, no reassignment has been made, so control passes to block 77. Block 77 resets flag K and passes control to block 80. Now i=3=N and, therefore, the process terminates.

If it had been found that a node had been reassigned in block 70, block 75 would have returned control to block 70 to consider the new first member of the subset under consideration.

Thus, at the end of the FIG. 2 process, when the initial assignment of nodes is the one presented in Table III, the final node assignments are shown in Table IV below.

TABLE IV

| Subset 1 | | Subset 2 | | Subset 3 | |
|---|---|---|---|---|---|
| Node ID | Prob ε | Node ID | Prob ε | Node ID | Prob ε |
| 135.16.20.33 | 0.100 | 135.16.20.26 | 0.090 | 135.16.20.8 | 0.059 |
| 135.16.20.31 | 0.100 | 135.16.20.19 | 0.078 | 135.16.20.35 | 0.050 |
| 135.16.20.23 | 0.100 | 135.16.20.100 | 0.077 | 135.16.20.144 | 0.037 |
| 135.16.20.22 | 0.098 | 135.16.20.17 | 0.065 | 135.16.20.4 | 0.027 |
| | | 135.16.20.18 | 0.064 | 135.16.20.1 | 0.027 |

TABLE IV-continued

| | Subset 1 | | Subset 2 | | Subset 3 | |
|---|---|---|---|---|---|---|
| Node ID | Prob $\epsilon$ | Node ID | Prob $\epsilon$ | Node ID | Prob $\epsilon$ |
| | | | | 135.16.20.103 | 0.027 |
| | | | | 135.16.20.102 | 0.002 |

As indicated above, the initial selection of a subset to which a node is assigned (or where the initial demarcation lines are placed) can yield a different final node assignment. In other words, the simple tests disclosed above yield a local minimum, and not necessarily the absolute minimum. To illustrate, Table V presents an initial selection that is different from that of Table III.

TABLE V

| Subset 1 | | Subset 2 | | Subset 3 | |
|---|---|---|---|---|---|
| Node ID | Prob $\epsilon$ | Node ID | Prob $\epsilon$ | Node ID | Prob $\epsilon$ |
| 135.16.20.33 | 0.100 | 135.16.20.19 | 0.078 | 135.16.20.35 | 0.050 |
| 135.16.20.31 | 0.100 | 135.16.20.100 | 0.077 | 135.16.20.144 | 0.037 |
| 135.16.20.23 | 0.100 | 135.16.20.17 | 0.065 | 135.16.20.4 | 0.027 |
| 135.16.20.22 | 0.098 | 135.16.20.18 | 0.064 | 135.16.20.1 | 0.027 |
| 135.16.20.26 | 0.090 | 135.16.20.8 | 0.059 | 135.16.20.103 | 0.027 |
| | | | | 135.16.20.102 | 0.002 |

Carrying out the calculations according to the flow chart of FIG. 2 with reference to the Table V initial assignment reveals that no nodes need to be reassigned. Clearly, the assignment shown in Table V is different from the assignment shown in Table IV.

It can be shown that, regardless of the initial assignment made, the final assignment arrived at meets the condition $$\frac{p_1}{k_1} \geq \frac{p_2}{k_2} \geq \ldots \geq \frac{p_N}{k_N}.$$

The resource consumption, or cost of the search, is therefore $$R = p_1 k_1 + p_2(k_1 + k_2) + \ldots + p_N(k_1 + k_2 + \ldots + k_N)$$

In the illustrative example presented above, the average cost of a search for the assignments in Table IV is 8.606, and the average cost of a search for the assignments in Table V (i.e., how many nodes need to perform the search) is 8.674. It looks like the node assignment is more effective in Table V than in Table IV, although not by much. Also, the average time that a search takes for the assignments of Table IV is 1.83, while the average time that a search takes for the assignments of Table V is 1.684.

The process of FIG. 2 can be improved by adding an additional step of testing and moving of nodes from one subset to another. It is a two-node step rather than the one-node steps of FIG. 2. Specifically, distribution of objects to subsets is arranged in such a way that if subset i contains an object with a priori probability $\epsilon_{ih}$ and subset i+1 contains an object with a priori probability $\epsilon_{(i+1)h}$, then those two objects should be moved to subset i−1 and i, respectively, if the condition $$p_{i-1} + p_i \leq (k_{i+1} - 1) \cdot \epsilon_{(i+1)h} + k_i \cdot \epsilon_{ih}$$

is met. As an aside, this inequality is satisfied, if at all, by selecting the largest probabilities is subsets i and i+1 (and that is what the subscript h designates).

Figure 3:
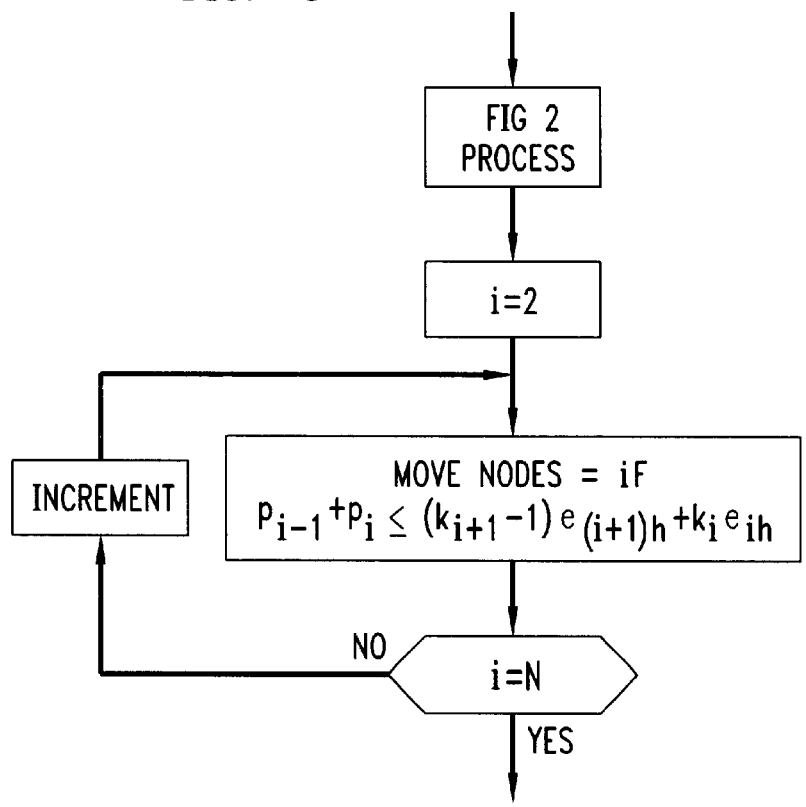
FIG. 3 presents the process of FIG. 2 that is improved with an additional step.

Applying the above inequality after the process of FIG. 2 terminates, as shown in FIG. 3, tables IV and V become identical because when applying the inequality when i=2, the results dictates that node 135.16.20.26 should be shifted to subset 1, and that node 135.16.20.8 should be shifted to subset 2.

While the addition of the third test as disclosed above and depicted in FIG. 3 will improve the allocation process, it should be mentioned that it still does not guarantee the absolute minimum cost. The process can be extended to more nodes at a time, or to the use of other well-known optimization techniques, but for most cases the one-node or the two-node approaches will suffice.

As mentioned earlier, the decision to select three subsets is somewhat arbitrary, and the above-disclosed process can be carried out for a number of different values of N. The system designer can then make a selection as to which value of N suits best.

It ought to be emphasized, perhaps, that the grouping selected by server 100 to find a particular kind of information is not necessarily the grouping that is employed for a different application. Each application is independent, and each is based on the set of a priori probabilities for that application. Accordingly, server 100 maintains a plurality of probability sets for the different applications that server 100 may activate. Furthermore, the a priori probabilities for any particular application are not necessarily static. Indeed, they ought to reflect that which exists in the various nodes, and that information can change with time. Accordingly, server 100 includes a mechanism for recording the results of search requests of each application. In accordance with a preselected algorithm, e.g., a moving window of, say, 1000 search requests, server 100 modifies the set of probabilities that are employed in assigning nodes to subsets, and repeats the process of assigning nodes to subsets. The repetition can be regular, perhaps every so many searches, or it may be carried out only when the average of the changes in probabilities exceeds a preselected threshold.

I claim:

1. In an arrangement where a server seeks information that is available at one of a plurality of nodes and where said server is able to establish broadcast communication with said nodes, a method for reducing broadcast traffic in said arrangement comprising the steps of:
   broadcasting at most N search requests, where N is an integer, with each search request directed to a different subset of said nodes said subsets being mutually exclusive, where said nodes are arranged in N subsets based on an average probability of success in the subset of finding the sought information, and where the search requests are directed to the subsets in order of said average probability of success.

2. The method of claim 1 where the search requests are directed to the subsets in order of the average probability of success, starting with the subset having the largest probability of success.

3. The method of claim 1 further comprising a step of dividing said nodes into said set of subsets.

4. The method of claim 3 where said step of dividing is performed regularly.

5. The method of claim 3 where said step of dividing is performed less often than the step of broadcasting.

6. The method of claim 5 where the step of dividing is performed whenever said average probabilities of success change by more than a preselected threshold.

7. The method of claim 1 where the said average probabilities of success are evaluated based on a preselected number of search results.

8. The method claim 1 where the step of dividing is performed whenever the number of subsets, N, is sought to be altered.

9. The method of claim 3 where the step of dividing comprises:

allocating each one of said other nodes to one of said N subsets, evaluating $$\frac{p_i}{k_i}$$

where $k_i$ is the number of nodes in subset i, $$p_i = \sum_j \varepsilon_{ij},$$

where $\epsilon_{ij}$, is the probability that node j in subset i contains the sought information, and where i is a subset-identifying index such that $$\frac{p_1}{k_1} \geq \ldots \frac{p_i}{k_i} \geq \ldots \frac{p_N}{k_N}.$$

10. The method of claim 9 further comprising a step of reassigning select nodes among said N subsets pursuant to a test to determine whether a better assignment of nodes to subsets can be made.

11. The method of claim 10 where the step of reassigning comprises the step of:

for each subset i, a node within subset i with probability $\epsilon_j$, testing to determine whether $$\varepsilon_j \leq \frac{p_i}{(k_{i+1} + 1)},$$

and if so, allocating the node to subset i+1, and for each subset i, a node within subset i with probability $\epsilon_j$, testing to determine whether $$\varepsilon_j \leq \frac{p_{i-1}}{(k_i - 1)},$$

and if so, allocating the node to subset i−1.

12. The method of claim 11 where the step of reassigning further comprises a step of:

for each subset i and subset i+1, testing to determine whether $$p_{i-1} + p_i \leq (k_{i+1} - 1) \cdot \epsilon_{(i+1)h} + k_i \cdot \epsilon_{ih},$$

where $\epsilon_{ih}$ is the probability of the node in subset i that has the highest probability and $\epsilon_{(i+1)h}$ is the probability of the node in subset i+1 that has the highest probability, and if so, allocating the node probability $\epsilon_{ih}$ to subset i−1 and allocating the node with probability $\epsilon_{(i+1)h}$ to subset i.

13. In an arrangement where a first node seeks information that is available at one of a plurality of other nodes and where said first node is able to establish broadcast communication with said other nodes, a method for reducing broadcast traffic in the arrangement comprising the steps of:

dividing said other nodes into an ordered set of node groupings the nodes in said groupings being mutually exclusive, based on probability measures for finding the sought information in the individual ones of the said other nodes, and broadcasting a search request to each grouping, seriatim, starting with the grouping that has the largest average probability of success.

14. In the arrangement of claim 1 where the server maintains probability information pertaining to different classes of information that may be sought from the nodes, the method further comprises the steps of:

identifying the class to which the sought information belongs, and in preparation for the step of broadcasting to subsets, selecting the subsets of nodes based on the class to which the sought information belongs.

* * * * *